(12) United States Patent
Chiu

(10) Patent No.: US 7,470,387 B2
(45) Date of Patent: Dec. 30, 2008

(54) CLOSURE CLOSING DEVICE AND METHOD

(75) Inventor: Kevin Khai Hai Chiu, Markham (CA)

(73) Assignee: StackTeck Systems Limited, Brampton, Ontario (CA)

( * ) Notice: Subject to any disclaimer, the term of this patent is extended or adjusted under 35 U.S.C. 154(b) by 445 days.

(21) Appl. No.: 11/408,354

(22) Filed: Apr. 21, 2006

(65) Prior Publication Data
US 2006/0254023 A1 Nov. 16, 2006

(30) Foreign Application Priority Data
May 2, 2005 (CA) .................................. 2505962

(51) Int. Cl.
*B29C 65/56* (2006.01)
(52) U.S. Cl. .................. 264/238; 249/58; 249/161; 264/339; 425/441; 425/556
(58) Field of Classification Search ............... 264/238, 264/339; 425/517, 441; 249/58, 161; 29/453
See application file for complete search history.

(56) References Cited

U.S. PATENT DOCUMENTS

| | | | |
|---|---|---|---|
| 4,340,352 A * | 7/1982 | Hayberg ..................... 425/517 |
| 4,351,630 A | 9/1982 | Hayberg et al. |
| 4,557,684 A * | 12/1985 | Romine et al. ............... 425/383 |
| 4,741,088 A | 5/1988 | Ramella |
| 4,783,056 A | 11/1988 | Abrams |
| 4,812,116 A | 3/1989 | Abrams |
| 5,744,082 A * | 4/1998 | Bak ............................ 264/238 |
| 5,906,841 A * | 5/1999 | Bak ............................ 425/556 |
| 6,303,064 B1 * | 10/2001 | Abrams et al. ............... 264/238 |
| RE37,676 E * | 4/2002 | Abrams et al. ............... 264/238 |
| 7,168,149 B2 * | 1/2007 | Kalemba et al. ............ 29/527.1 |

* cited by examiner

*Primary Examiner*—Yogendra Gupta
*Assistant Examiner*—Emmanuel S Luk
(74) *Attorney, Agent, or Firm*—Pearne & Gordon LLP

(57) ABSTRACT

The present invention provides a laterally movable lifting arm and follower which may be mounted adjacent a mold. The lifting arm is movable from a cap engaging position wherein it initially moves the cap away from the mold into the path of the follower. The cap is initially moved across the lid by lateral movement of the lifting arm. The follower is subsequently passed across the cap to lockingly engage the closure.

17 Claims, 6 Drawing Sheets

CLOSURE CLOSING DEVICE AND METHOD

FIELD OF THE INVENTION

This invention relates to injection molded closures, particularly of the "flip-top" type. More specifically, the present invention relates to a component of a molding apparatus which closes the closure prior to part ejection.

BACKGROUND OF THE INVENTION

A typical injection molded closure of the "flip-top" type has a closure body hingedly connected to a cap. The cap is swingable about the hinged connection over the closure body. The cap and closure body are provided with mutual interlocking means such as a protrusion which engages a lip to secure the cap to the closure body in a closed configuration. The cap and closure body are generally molded simultaneously in an open configuration with the cap adjacent the closure body.

In-mold closing devices are used for molding such closures. In order to provide a good seal and fit between the protrusion and the cap and the lip and the closure body, it is desirable to engage the respective sides of these components immediately after molding for optimizing shrinkage during cooling. The closing of the cap also simplifies handling after molding and part ejection, as this alleviates concern that the parts will interlock with each other, or damage the hinge. As well, by flexing the hinge while it is still warm, the hinge has a tendency to withstand more open and close cycles of the cap.

A device for effecting closure of a cap over a closure body is described in U.S. Pat. No. 4,351,630 (Hayberg et al) which discloses the use of a push pin mounted within one of the mold halves to push a cap into an upright position in order for a slide finger having a roller to roll over and snap shut the cap in its closed configuration. This apparatus requires synchronized movement between the pin and the slide finger which is problematic as the components have independent actuation. Accordingly, there remains the possibility of collision between the two components. Furthermore, the pin is problematic in mold design, as the pin and a piston assembly behind the pin which actuates the pin need to be directly located behind the cap. This restriction may reduce the cooling accessible to the cap and as well complicates mold design.

U.S. Pat. No. 4,741,088 (Ramella) teaches forming a cap over a closing mechanism. Closing is effected by having the mechanism move away from and then along the closure.

U.S. Pat. Nos. 4,812,116 and 4,783,056 (both of which issued to Abrams) teach the use of a flipper arm mounted to a mold cavity plate to flip a lid over a vial. As with the Hayberg and Ramella structures, Abrams has an in-mold component and accordingly doesn't avoid the problems associated with accommodating a closing unit as part of a mold.

An object of the present invention is to eliminate having a synchronized pin and slide finger arrangement to avoid the possibility of in-mold collisions. A further object of the present invention is to provide a closing device for closing a cap over an injection molded closure body without requiring an in-mold component for initial lifting of the cap.

SUMMARY OF THE INVENTION

In general terms, the present invention provides a laterally movable lifting arm and follower which may be mounted adjacent a mold. The lifting arm is movable from a cap engaging position wherein it initially moves the cap away from the mold into the path of the follower. The cap is initially moved across the lid by lateral movement of the lifting arm. The follower is subsequently passed across the cap to lockingly engage the closure.

More specifically, a closing device is provided for closing a molded closure while the closure is in a mold and wherein the closure has a body hingedly connected to a cap. The cap is swingable about the hinge over the closure body and the cap and enclosure body are provided with mutual interlocking means for securing the cap to the closure in a closed configuration. The closing device has a head movable across the cap and the closure in a lateral direction while the cap and closure are in the mold. The device further has a lifting arm with a base end movably connected to the head and a forward end extending away from the head for contacting the cap. A follower is connected to the head adjacent the base end of the lifting arm. A lifting arm actuator is provided which acts between the head and the lifting arm for moving at least the forward end of the lifting arm to contact the cap and to move the cap from an open molded configuration toward the closed configuration. A head actuator is provided for moving the head in conjunction with the arm and the follower across the cap and the closure for the follower to urge the cap toward the closure to engage the interlocking means and secure the closure in the closed configuration.

The head actuator may be a fluid pressure responsive drive or a screw drive.

The head may be mounted on a carrier plate on which the head actuator acts.

The carrier plate may be slidably secured to a mounting plate, the mounting plate securing the closing device to a mold assembly and the actuator acting between the carrier plate and the mounting plate.

The lifting arm may be hingedly affixed to the head for rotational movement about a hinge axis transverse to the lateral direction. The lifting arm actuator may have a first member movable relative to the lifting arm parallel to the lateral direction and a translating coupling extending between the lifting arm and the first member to translate relative movement between the first member and the lifting arm into the rotational movement.

The translating coupling may be a rack carried by the first member which acts on a pinion connected to the lifting arm.

Alternatively, the translating coupling may be a cam carried by the first member which acts against a cam follower connected to the lifting arm.

As a further alternative, the translating device may be a link pivotally coupled as a first end to the first member and at a second end to the lifting arm.

In a further embodiment, the closing device may be a fluid pressure actuated rod and cylinder assembly connected to act between a lifting arm and the head.

The closing device may have a coupler coupling the first member to the carrier plate and to the mounting plate for moving the first member relative to the lifting arm in response to relative movement between the carrier plate and the mounting plate.

The coupler may have a first stop connected to the first member for acting on the carrier plate to limit movement of the first member toward the lifting arm. A second stop may be connected to the carrier plate for acting against the mounting plate to limit movement of the carrier plate away from the mounting plate. A first biasing means may be connected to the first member and to the carrier plate for urging the first member toward the lifting arm.

The lifting arm actuator may include an actuator plate on an opposite side of the mounting plate from the carrier plate and an intermediate plate between the actuator plate and the mounting plate. The actuator plate and the carrier plate may be movable toward and away from the mounting plate. An intermediate stop may be connected to the mounting plate for acting against the intermediate plate to limit movement of the intermediate plate away from the mounting plate. A second biasing means may be connected to the mounting plate and the intermediate plate to urge the intermediate plate and in turn the actuator plate away from the mounting plate. The first biasing means may exert a biasing force greater than that of the second biasing means by an amount sufficient to avoid movement of the first member toward to the lifting arm until the intermediate plate abuts against the carrier plate and the carrier plate abuts against the mounting plate.

The first and second biasing means may be resilient members.

The first and second biasing means may be springs.

The invention also provides a method for closing a cap over a closure in a mold cavity with the method comprising the following steps:

(i) providing a laterally movable lifting arm and follower adjacent the mold cavity;

(ii) engaging the cap with the lifting arm;

(iii) rotating the lifting arm to lift the cap away from a corresponding recess in the mold cavity;

(iv) moving the lifting arm across the closure body by laterally moving the lifting arm; and (v) passing the follower across the cap to urge the cap toward the closure body to lockingly engage the cap with the closure body.

DESCRIPTION OF DRAWINGS

The invention is described in detail below with reference to the accompanying drawings in which.

DESCRIPTION OF PREFERRED EMBODIMENTS

Figure 1A:
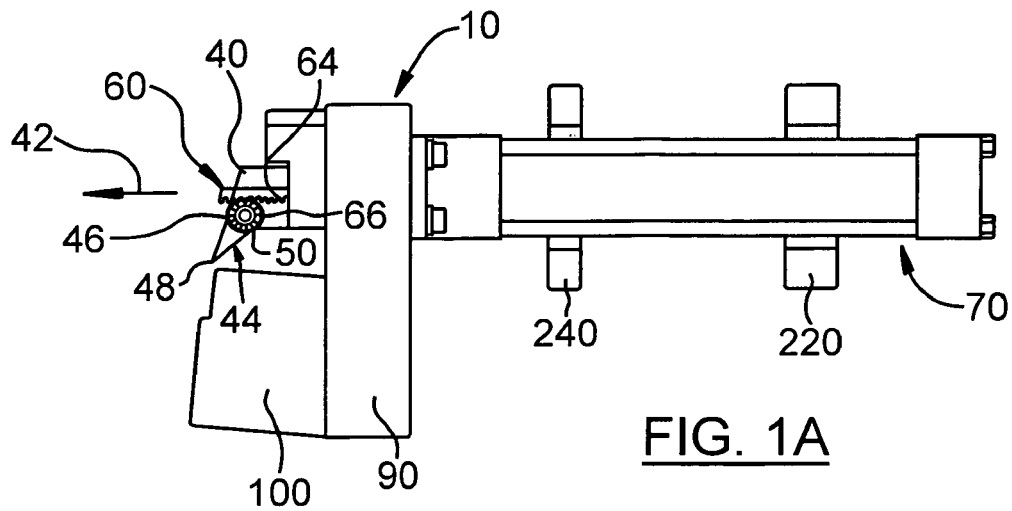
FIG. 1A is a front elevation illustrating a closing device according to the present invention in a parked position.
Figure 1B:
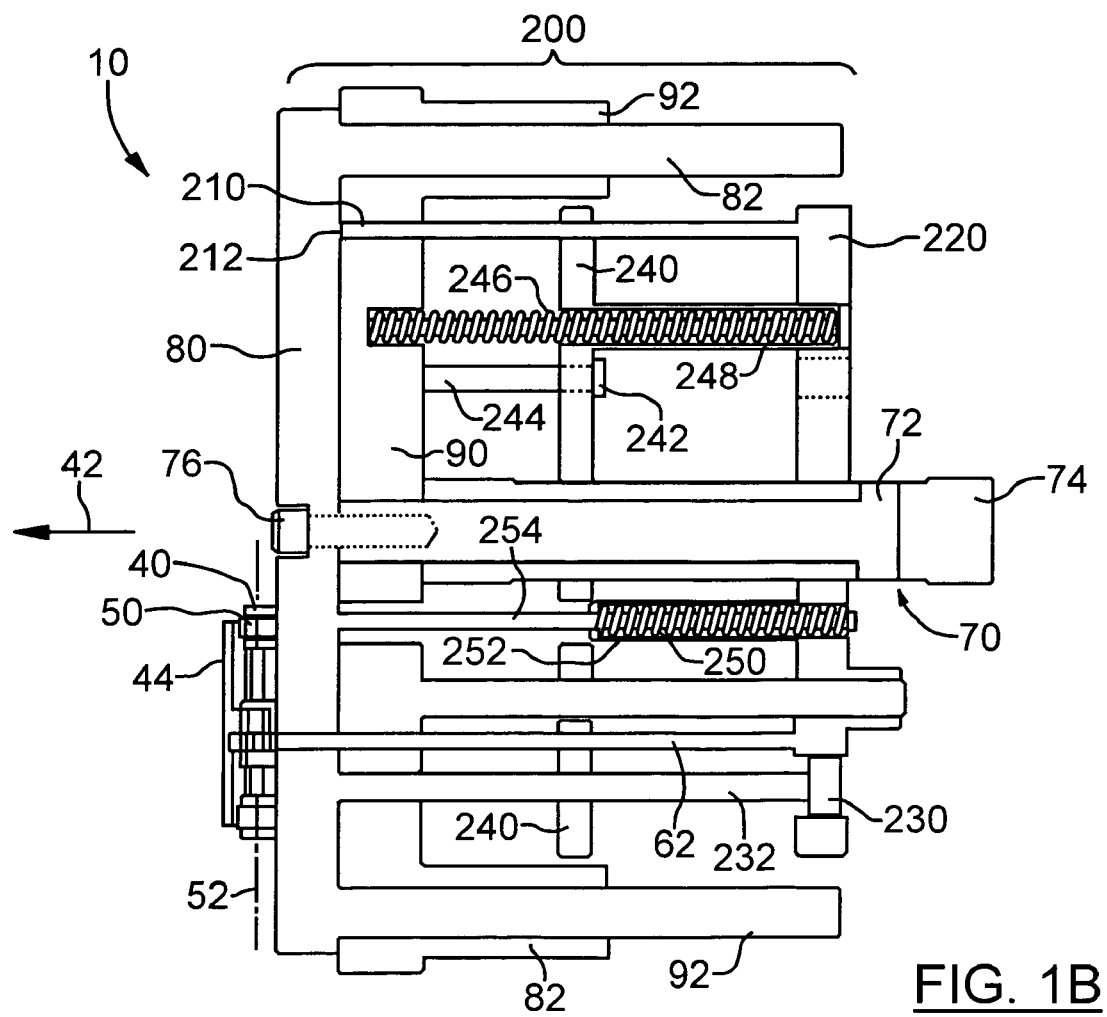
FIG. 1B is a schematic view from above corresponding to FIG. 1A.
Figure 2A:
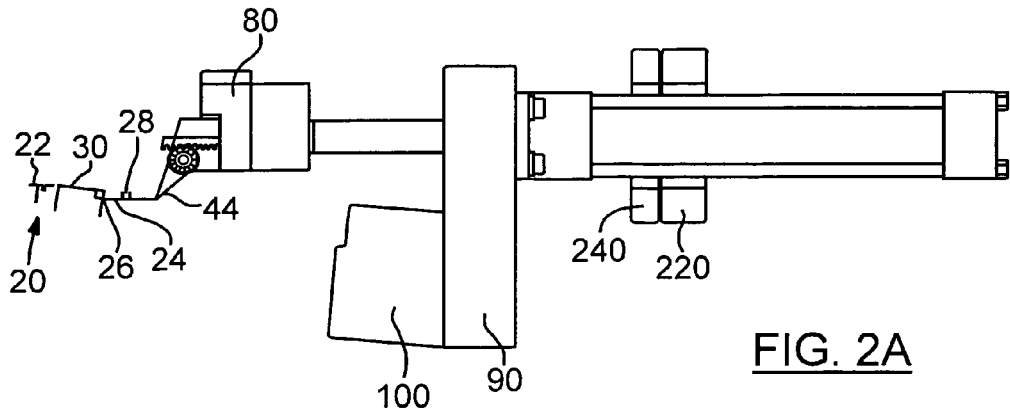
FIG. 2A is a view corresponding to FIG. 1A but illustrating the closing device in a ready to flip position.
Figure 3A:
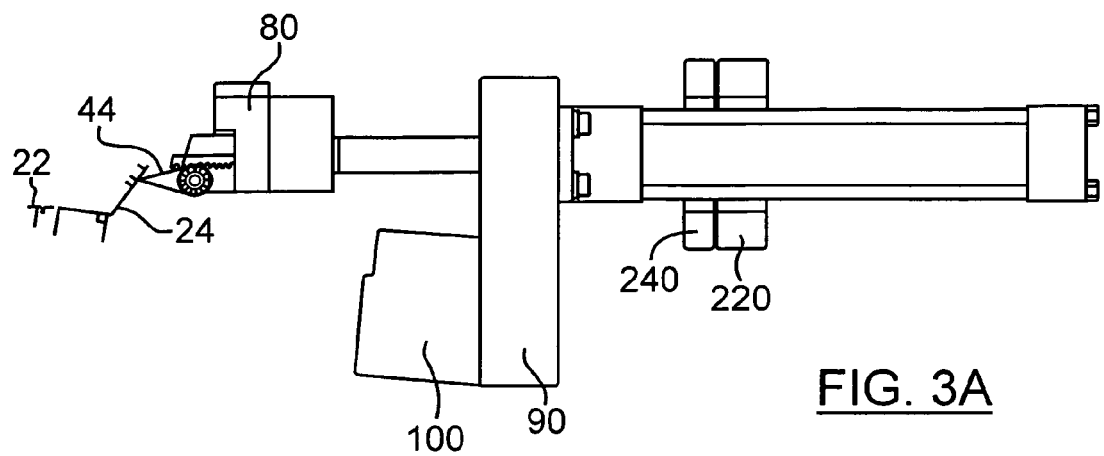
FIG. 3A is a front elevation of a closing device according to the present invention in a finished flip position.
Figure 4A:
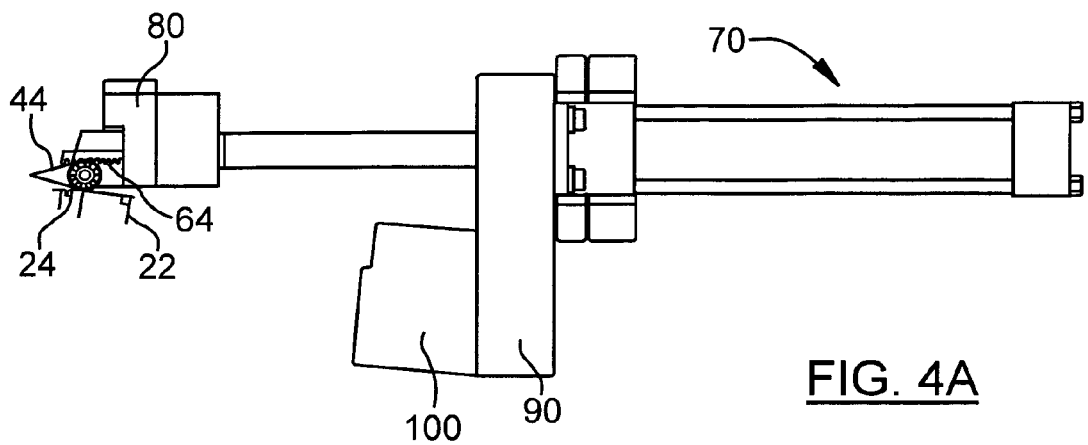
FIG. 4A is a front elevation of a closing device according to the present invention in a closed lid position.
Figure 4B:
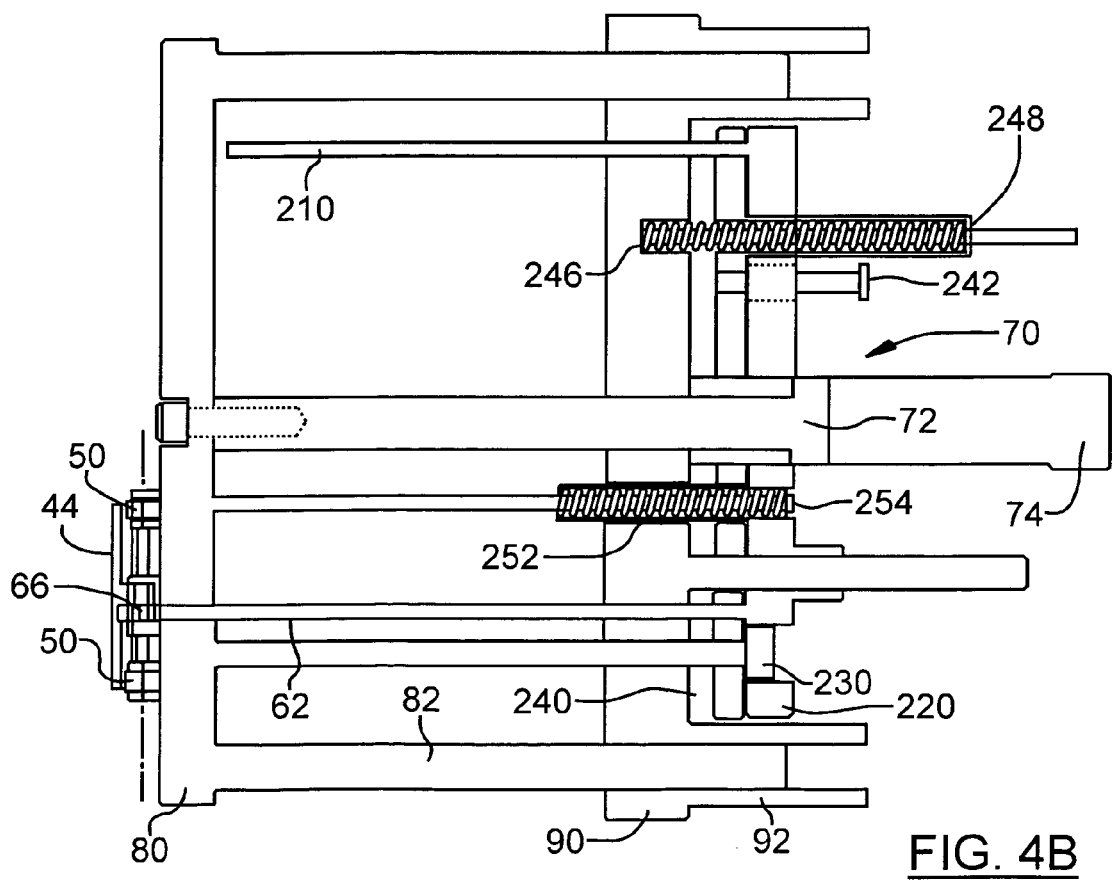
FIG. 4b is a schematic view from above corresponding to FIG. 4A.

A closing device according to the present invention is generally indicated by reference numeral 10 in the accompanying illustrations. FIGS. 2A, 3A and 4A illustrate a representative closure 20 having a closure body 22 hingedly connected to a cap 24 by an integral hinge 26. The cap 24 and closure body 22 are provided with mutual interlocking means for securing the cap 24 to the closure body 22. The interlocking means illustrated include a protrusion 28 extending from the cap 24 which registers with and is received by a lip 30 extending about a passage through the closure body 22.

The closing device 10 has a head 40 movable across the cap 24 and the closure body 22 in a "lateral" direction illustrated by arrow 42 while the closure is in the mold. "Lateral" should be interpreted in a general rather than a specific sense to include but not be restricted to having the head 40 move parallel to the mold. For example, as illustrated in FIGS. 1A, 2A, 3A and 4A, the closing device 10 may be titled slightly toward the closure 20 for the head 40 to move non-parallel to (i.e. at an angle to) a face of the mold or the cap 24. A lifting arm 44 having a base end 46 is movably connected to the head 40. The lifting arm 44 further has a forward end extending away from the head for contacting the cap 24 as illustrated for example in FIG. 2A.

A follower 50 such as the roller illustrated is connected to the head 40 adjacent the base end 46 of the lifting arm 44.

A lifting arm actuator 60 acts between the head 40 and the lifting arm 44 for moving at least the forward end 48 of the lifting arm 44 to contact the cap 24 and to move the cap 24 from an open molded configuration as illustrated in FIG. 2A initially toward a partially closed configuration as illustrated in FIG. 3A and eventually toward a fully closed position as illustrated in FIG. 4A. Various configurations for the lifting arm actuator may be utilized as discussed in more detail below. Generally, the lifting arm actuator 60 is arranged to move the lifting arm 44 for its forward end 48 to raise the cap away from a corresponding recess in a mold cavity (not illustrated). Illustrative examples are discussed in more detail below.

A head actuator generally indicated by reference 70 is provided for moving the head 40 in conjunction with the lifting arm 44 and the follower 50 across the cap 24 and the closure body 22 for the follower 50 to urge the cap 24 toward the closure body 22 to engage the interlocking means 28 and 30 and secure the closure 20 in its closed configuration.

The head actuator 70 illustrated is a fluid pressure responsive drive comprising a piston 72 within a cylinder 74 of the type commonly referred to as a "pneumatic cylinder" or "hydraulic cylinder", depending on the nature of the fluid. Other head actuator arrangements may be apparent to those skilled in such devices, such as a screw drive, a rack and pinion arrangement or a chain and sprocket assembly.

The head 40 may be mounted on a carrier plate 80 on which the head actuator 70 acts by virtue of the carrier plate 80 being connected to the piston 72 by a connector 76. As illustrated, the carrier plate 80 may be slidably secured to a mounting plate 90 which is connected to a mold assembly represented by reference 100 to secure the closing device 10 to the mold assembly 100. The cylinder 74 of the head actuator 70 is also secured to the mounting plate 90 for the head actuator 70 to act between the mounting plate 90 and the carrier plate 80 to cause movement of the carrier plate and in turn the head 40 in the lateral direction 42. Guidance may be provided by having pins 82 extending from the carrier plate 80 received by bushings 92 in the mounting plate 90.

The mounting plate 90 may be attached to the side of the mold, on a cavity plate or a stripper plate (which is not shown). Generally as long as the closing device 10 is in a repeatable position from which the lifting arm 44 can access the caps 24 during actuation, any of the foregoing attachment points may be used.

The lifting arm 44 is illustrated as being hingedly affixed to the head 40 for rotational movement about a hinge axis 52 transverse to the lateral direction 40. If a roller is used for the follower 50, the hinge axis may correspond with the rotational axis of the roller.

The lifting arm actuator 60 has a first member 62 which is movable relative to the lifting arm 48 in a direction parallel to the lateral direction 42. Different embodiments of the first member 62 are described below.

A translating coupling, also described in more detail below may be provided which extends between the lifting arm 44 and the first member 62 to translate relative movement between the first member 62 and the lifting arm 44 into the aforementioned rotational movement.

The translating coupling may, as illustrated in FIGS. 1A through 4B comprise a rack 64 extending along the first member 62 which engages a pinion 66 connected to the lifting arm 44. Alternate embodiments are illustrated in FIGS. 5A through 7B.

Figure 5A:
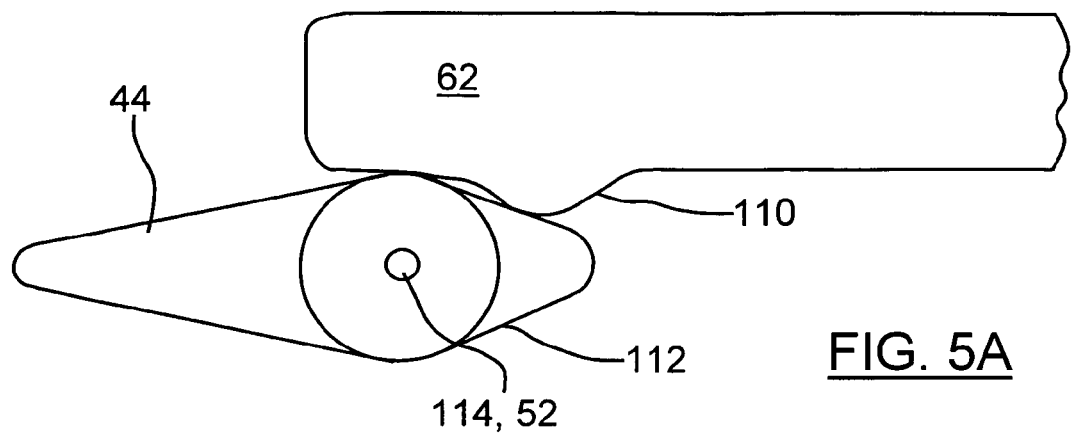
FIG. 5A is a schematic representation of an alternate embodiment of a lifting arm actuator to that illustrated in FIG. 1A through 4B in actuating configuration.
Figure 5B:
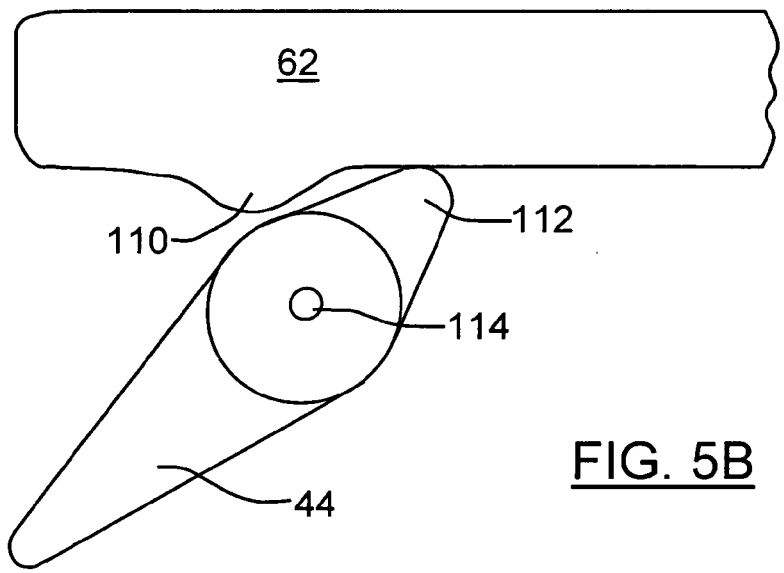
FIG. 5B is a schematic representation of the lifting arm actuator of FIG. 5A in its non-actuating configuration.

FIG. 5A illustrates a cam 110 secured to the first member 62 and a cam follower 112 which acts against the cam 110. The cam follower 112 is secured to the lifting arm 44 to pivot about a pivot 114 corresponding to the hinge axis 52 of the lifting arm 44. As can be seen by comparing FIGS. 5A and 5B, relative lateral movement of the first member 62 and the cam follower 112 will cause rotation of the lifting arm 44 about the pivot 114 between an actuating configuration illustrated in FIG. 5A and a non-actuating configuration illustrated in FIG. 5B.

Figure 6A:
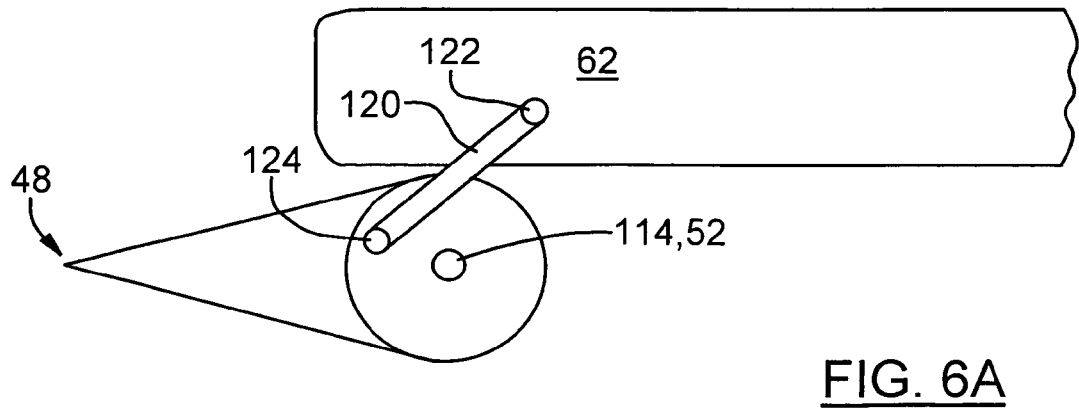
FIG. 6A is a schematic representation of a further alternate embodiment of a lifting arm actuator in an actuated configuration.
Figure 6B:
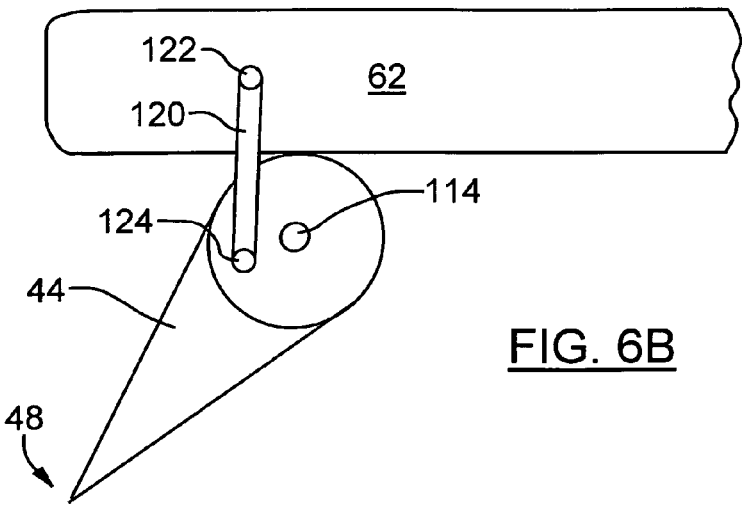
FIG. 6B is a schematic representation of the lifting arm actuator of FIG. 6A in its non-actuating configuration.

FIGS. 6A and 6B illustrate the use of a linkage arm in a lifting arm actuator 60. As illustrated in FIGS. 6A and 6B, a link 120 is pivotably coupled at a first end 122 to the first member 62 and at a second end 124 to the lifting arm 44. As can be seen by comparing FIGS. 6A and 6B, movement of the first member 62 to the left (as illustrated) causes downward movement of the forward end 48 of the lifting arm 44. Conversely, movement of the first member 62 to the right causes upward movement of the forward end 44 about the pivot 114.

Figure 7A:
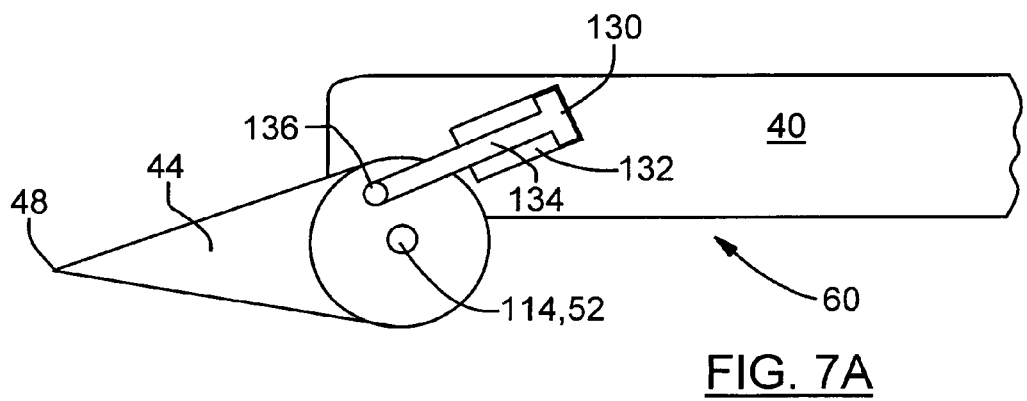
FIG. 7A is a schematic representation of an alternate lifting arm actuator in its actuating configuration; and, FIG. 7B is a schematic representation of the lifting arm actuator of FIG. 7A in its non-actuating configuration.
Figure 7B:
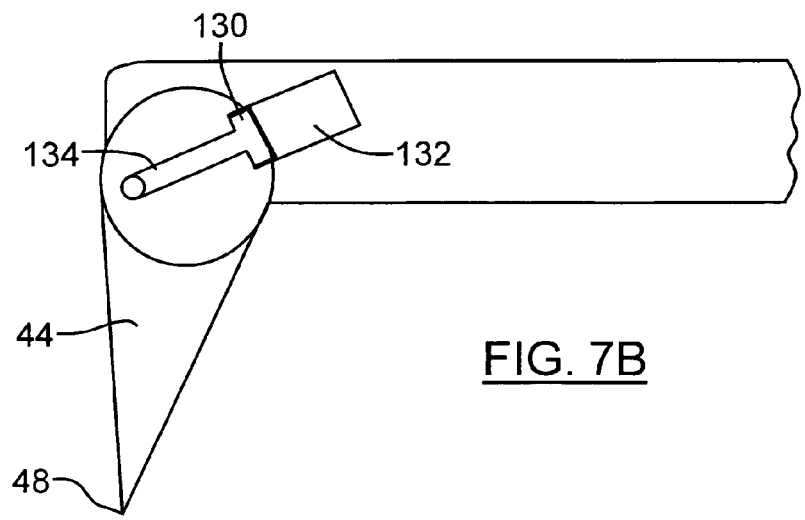

FIGS. 7A and 7B illustrated an alternative arrangement for a lifting arm actuator 60. According to the FIGS. 7A and 7B embodiment, the lifting arm actuator 60 does not rely upon relative movement between a first member and the lifting arm 44. Instead, a piston 130 slidably movable in a cylinder 132 is mounted to the head 40. A connecting rod 134 extends between the piston 130 and the lifting arm 44, being pivotably connected by pivotal coupling 136 to the lifting arm 44. Movement of the piston along the bore of the cylinder 132 from right to left (as illustrated) causes anti-clockwise rotation of the forward end 48 of the lifting arm 44 from the actuated configuration of FIG. 7A to the non-actuated configuration of FIG. 7B. Movement of the piston along the cylinder 132 may be effected by introducing a pressurized fluid between the piston 130 and the cylinder 132 on either side of the piston 130.

A coupler, generally indicated by reference 200 may be provided for coupling the first member 62 to the carrier plate 80 and to the mounting plate 90 for moving the first member 62 relative to the lifting arm 44 in response to relative movement between the carrier plate 80 and the mounting plate 90. The coupler 200 includes a first stop 210 connected to the first member 62 through an actuator plate 220. The actuator plate 220 is on an opposite side of the mounting plate 90 from the carrier plate 80. The first stop 210 has a first end 212 which abuts against the carrier plate 80 to limit movement of the first member 62 toward the lifting arm 44.

A second stop 230 is connected to the carrier plate 80 by a connector rod 232. The second stop acts against the mounting plate 90 to limit movement of the carrier plate 80 away from the mounting plate 90. The action of the second stop 230 may, as illustrated, be through an intermediate plate 240 located between the mounting plate 90 and the actuator plate 220.

A first biasing means, such as the spring 250 is connected to the first member 62 through a first spring cup 250 secured to the actuator plate 220. The first biasing means 250 is also connected to the carrier plate 80 by a rod 254 for the first biasing means 250 to urge the first member 62 toward the lifting arm 44.

As can be seen by comparing FIGS. 1a through 4b, the actuator plate 220 and intermediate plate 240 are movable toward and away from the mounting plate 90 in the lateral direction 42.

An intermediate stop 242 is connected by a rod 244 to the mounting plate 90. The intermediate stop limits movement of the intermediate plate 240 away from the mounting plate 90. A second biasing means 246 abuts against the mounting plate 90 and is connected to the intermediate plate 240 through a second spring cup 248. As illustrated, the second biasing means may be a resilient member such as a spring. The second biasing means acts between the mounting plate 90 and the intermediate plate 240 to urge the intermediate plate 240 away from the mounting plate 90.

Figure 2B:
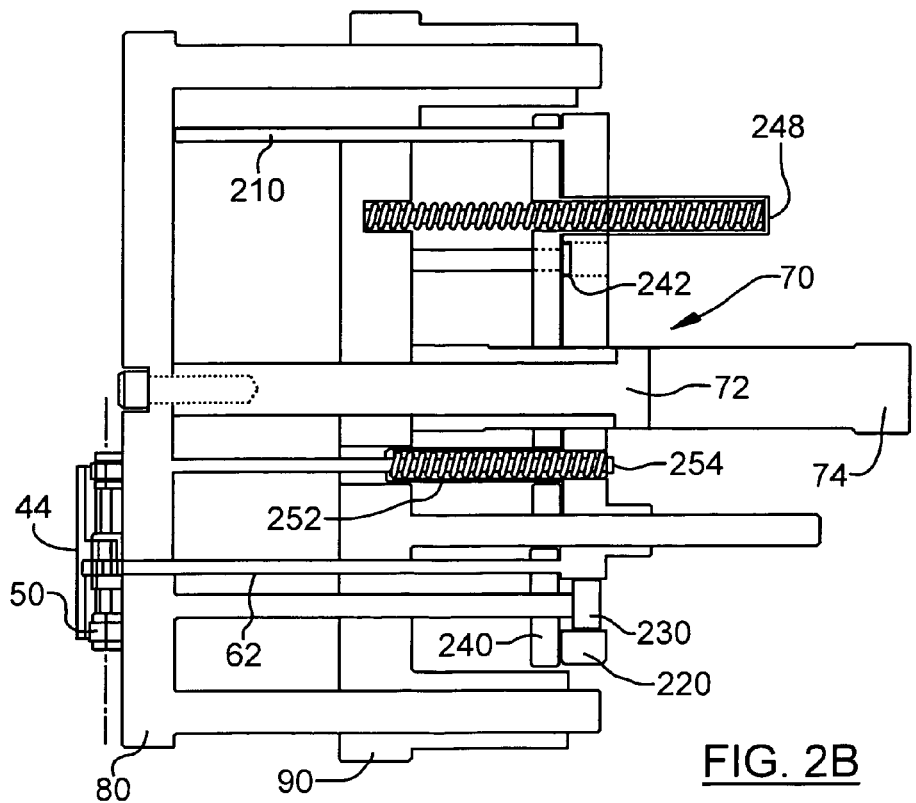
FIG. 2B is a schematic view from above corresponding to FIG. 2A.

The first biasing means 250 is selected to have a greater force than the second biasing means 246. Accordingly, movement of the piston 72 and in turn the carrier plate 80 to the left as illustrated will initially result in movement of the actuator plate 220 toward the intermediate plate 240 without any relative movement between the actuator plate 220 (and in turn the first member 62) and the lifting arm 44. Once the actuator plate 220 abuts against the intermediate plate 240, as illustrated in FIGS. 2A and 2B, the lifting arm 44 is in a "ready to flip" position in which it extends downwardly to engage the cap 24.

Figure 3B:
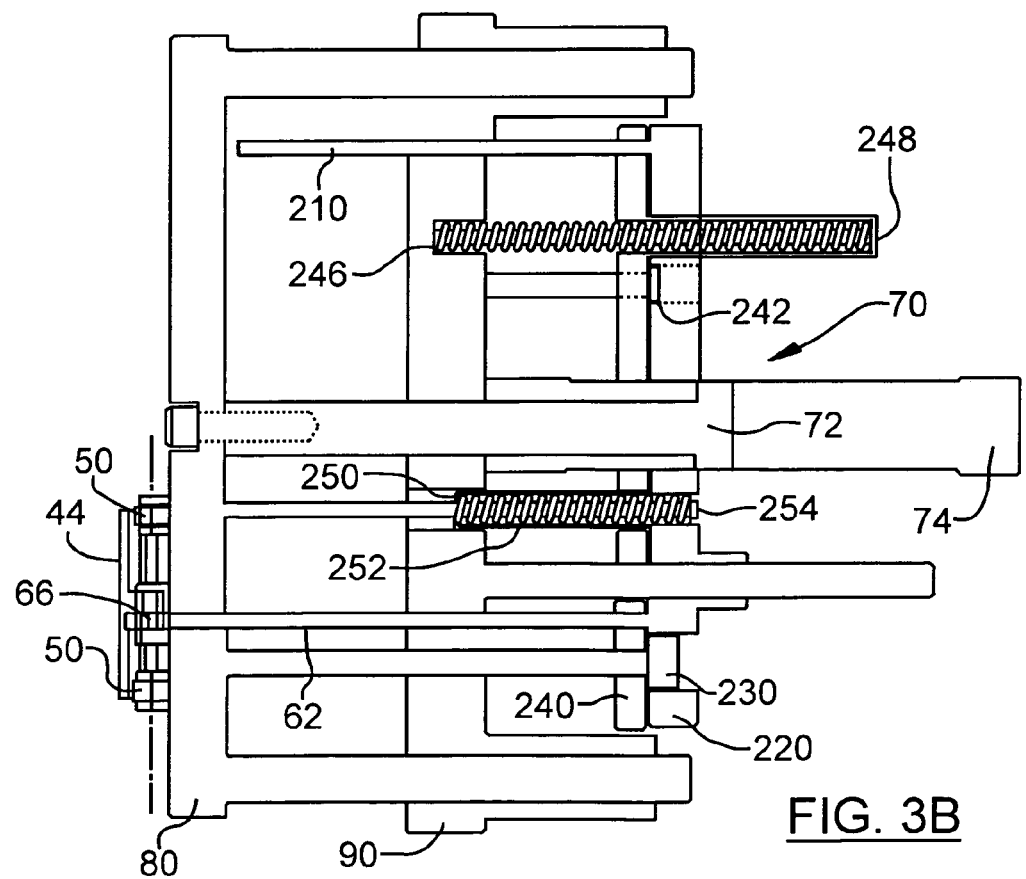
FIG. 3B is a schematic view from above corresponding to FIG. 3A.

Further movement of the piston 72 to the left as illustrated will over come the force exerted by the first biasing means 250 allowing relative movement between the lifting arm 44 and the first member 62. This causes rotation of the lifting arm upwardly, as illustrated in FIGS. 3A and 3B which aligns the cap for further closing.

Continued movement of the piston 70 to the left as illustrated initially causes the lifting arm 44 to urge the cap 24 over the closure body 22. Still further movement to the left causes the follower 50 to roll across the cap 24 to complete interlocking between the cap 24 and the closure body 22.

It will be appreciated that the coupling arrangement illustrated is but one manner in which the lifting arm 44 may be rotated to "lip" the cap 24. For example, if the piston and cylinder arrangement illustrated in FIGS. 7A and 7B is utilized for the lifting arm actuator 60, the coupler arrangement of FIGS. 1A through 4B would not be required. Instead, pressurized fluid would be introduced as required into the cylinder 132 to effect the movement of the lifting arm 44. Other variants may be apparent to persons skilled in such devices. For example, it may be possible to mount the first member 62 for lateral movement relative to the lifting arm 44 utilizing a more direct linkage such as a pressurized fluid operated cylinder or solenoid acting directly along the first member 62. With such an arrangement, it may also be possible to mount the first member 62 for transverse rather than longitudinal movement relative to the lateral direction 42.

The spring arrangement could also be replaced with other technology such as pistons, solenoids, motors etc. In general, anything that provides the back and forth movement in a controllable manner is a potential candidate for substitution.

Although the above description describes how the lifting arm 44 and follower close a single cap, the design is applicable to multiple columns of parts. In multiple column arrangements, the lifting arm 44 would pivot up and down over each part and the roller 50 could be on springs to roll over each column. It may also be possible to couple the lifting arm 44 to the roller 50 utilizing a connecting rod in a "locomotive-type" arrangement wherein rotation of the roller effects up and down movement of the lifting arm 44.

The above description is intended in an illustrative rather than a restrictive sense. Variations, such as those described above and others may be apparent to persons skilled in such structures without departing from the spirit and scope of the present invention as defined by the claims set below.

PARTS LIST

| | |
|---|---|
| 10 | closing device |
| 20 | closure |
| 22 | closure body |
| 24 | cap |
| 26 | hinge |
| 28 | protrusion |
| 30 | lip |
| 40 | head |
| 42 | lateral direction |
| 44 | lifting arm |
| 46 | base end (lifting arm) |
| 48 | forward end (lifting arm) |
| 50 | follower |
| 52 | hinge axis (lifting arm) |
| 60 | lifting arm actuator |
| 62 | first member |
| 64 | rack |
| 66 | pinion |
| 70 | head actuator |
| 72 | piston |
| 74 | cylinder |
| 76 | connector (piston to carrier plate) |
| 80 | carrier plate (head) |
| 82 | pins |
| 90 | mounting plate |
| 92 | bushing |
| 100 | mold assembly |
| 110 | cam |
| 112 | cam follower |
| 114 | pivot |
| 120 | link |
| 122 | first end link |
| 124 | second end link |
| 130 | piston |
| 132 | cylinder |
| 134 | connecting rod |
| 136 | pivotable coupling (rod to lifting arm) |
| 200 | coupler |
| 210 | first stop |
| 212 | end (of first stop) |
| 220 | actuator plate |
| 230 | second stop |
| 232 | connector rod (second stop to carrier plate) |
| 240 | intermediate plate |
| 242 | intermediate stop |
| 244 | rod (intermediate stop) |
| 246 | second biasing means |
| 248 | second spring cup |
| 250 | first biasing means |
| 252 | first spring cup (first biasing means) |
| 254 | rod (first biasing means) |

The invention claimed is:

1. A closing device for closing a molded closure while said closure is in a mold and wherein said closure has a body hingedly connected to a cap, said cap being swingable about said hinge over said closure body and said cap and said closure body as provided with mutual interlocking means for securing said cap to said closure body in a closed configuration, said closing device comprising:
    a head movable across said cap and said closure body in a lateral direction while said closure is in said mold;
    a lifting arm having a base end movably connected to said head and a forward end extending away from said head for contacting said cap;
    a follower connected to said head adjacent said base end of said lifting arm;
    a lifting arm actuator acting between said head and said lifting arm for moving at least said forward end of said lifting arm to contact said cap and to move said cap from an open molded configuration toward said closed configuration; and
    a head actuator for moving said head in conjunction with said arm and said follower across said cap and said closure body for said follower to urge said cap toward said closure body to engage said interlocking means and secure said closure in said closed configuration.

2. The closing device as claimed in claim 1 wherein said head actuator is a member selected from the group consisting of a fluid pressure responsive drive and a screw drive.

3. The closing device as claimed in claim 2 wherein said head is mounted on a carrier plate on which said head actuator acts.

4. The closing device as claimed in claim 3 wherein said carrier plate is slidably secured to a mounting plate, said mounting plate securing said closing device to a mold assembly and said head actuator acts between said carrier plate and said mounting plate.

5. The closing device as claimed in claim 4 wherein:
    said lifting arm is hingedly affixed to said head for rotational movement about a hinge axis transverse to said lateral directions;
    said lifting arm actuator further comprises a first member movable relative to said lifting arm parallel to said lateral direction and a translating coupling extending between said lifting arm and said first member to translate relative movement between said first member and said lifting arm into said rotational movement.

6. The closing device as claimed in claim 5 wherein said translating coupling is a rack carried by said first member which acts on a pinion connected to said lifting arm.

7. The closing device as claimed in claim 5 wherein said translating coupling is a cam carried by said first member which acts against a cam follower connected to said lifting arm.

8. The closing device of claim 5 wherein said translating device is a rigid link pivotably coupled at a first end thereof to said first member and at a second end thereof to said lifting arm.

9. The closing device of claim 5 wherein said follower is a roller.

10. The closing device of claim 4 wherein:
said lifting arm is hingedly connected to said head;
said closing device is a fluid pressure actuated rod and cylinder assembly connected to act between said lifting arm and said head.

11. The closing device of claim 10 wherein said follower is a roller.

12. The closing device of claim 5 further having a coupler coupling said first member to said carrier plate and to said mounting plate for moving said first member relative to said lifting arm in response to relative movement between said carrier plate and said mounting plate.

13. The closing device of claim 12 wherein said coupler further comprises:
a first stop connected to said first member for acting on said carrier plate to limit movement of said first member toward said lifting arm;
a second stop connected to said carrier plate for acting against said mounting plate to limit movement of said carrier plate away from said mounting plate; and
a first biasing means connected to said first member and said carrier plate for urging said first member toward said lifting arm.

14. The closing device of claim 13 wherein:
said coupler further includes an actuator plate on an opposite said of said mounting plate from said carrier plate and an intermediate plate between said actuator plate and said mounting plate, said actuator plate and said carrier plate being movable toward and away from said mounting plate;
an intermediate stop is connected to said mounting plate for acting against said intermediate plate to limit movement of said intermediate plate away from said mounting plate;
a second biasing means is connected to said mounting plate and said intermediate plate to urge said intermediate plate and in turn said actuator plate away from said mounting plate;
wherein said first biasing means exerts a biasing force greater than that of said second biasing means by an amount sufficient to avoid movement of said first member toward said lifting arm until said intermediate plate abuts against said carrier plate and said carrier plate abuts against said mounting plate.

15. The closing device of claim 14 wherein said first and second biasing means are resilient members.

16. The closing device of claim 15 wherein said first and second biasing means are springs.

17. A method for closing a cap over a closure in a mold cavity with the method comprising the following steps:
(i) providing a laterally movable lifting arm and follower adjacent the mold cavity;
(ii) engaging the cap with the lifting arm;
(iii) rotating the lifting arm to lift the cap away from a corresponding recess in the mold cavity;
(iv) moving the lifting arm across the closure body by laterally moving the lifting arm; and
(v) passing the follower across the cap to urge the cap toward the closure body to lockingly engage the cap with the closure body.

* * * * *

UNITED STATES PATENT AND TRADEMARK OFFICE
CERTIFICATE OF CORRECTION

| | | |
|---|---|---|
| PATENT NO. | : 7,470,387 B2 | Page 1 of 1 |
| APPLICATION NO. | : 11/408354 | |
| DATED | : December 30, 2008 | |
| INVENTOR(S) | : Kevin Khai Hai Chiu | |

It is certified that error appears in the above-identified patent and that said Letters Patent is hereby corrected as shown below:

The title page Item [54] should be corrected to read: --CLOSURE CLOSING DEVICE--

Column 6, Line 58: change "lip" to --flip--

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,470,387 B2
APPLICATION NO. : 11/408354
DATED : December 30, 2008
INVENTOR(S) : Kevin Khai Hai Chiu It is certified that error appears in the above-identified patent and that said Letters Patent is hereby corrected as shown below:

The title page Item [54] and Column 1, line 1 should be corrected to read: --CLOSURE CLOSING DEVICE--

Column 6, Line 58: change "lip" to --flip--

This certificate supersedes the Certificate of Correction issued March 10, 2009.

Signed and Sealed this

Thirty-first Day of March, 2009

JOHN DOLL
*Acting Director of the United States Patent and Trademark Office*